March 19, 1935.  L. H. THOEN  1,994,840
CHAIN
Filed May 27, 1930
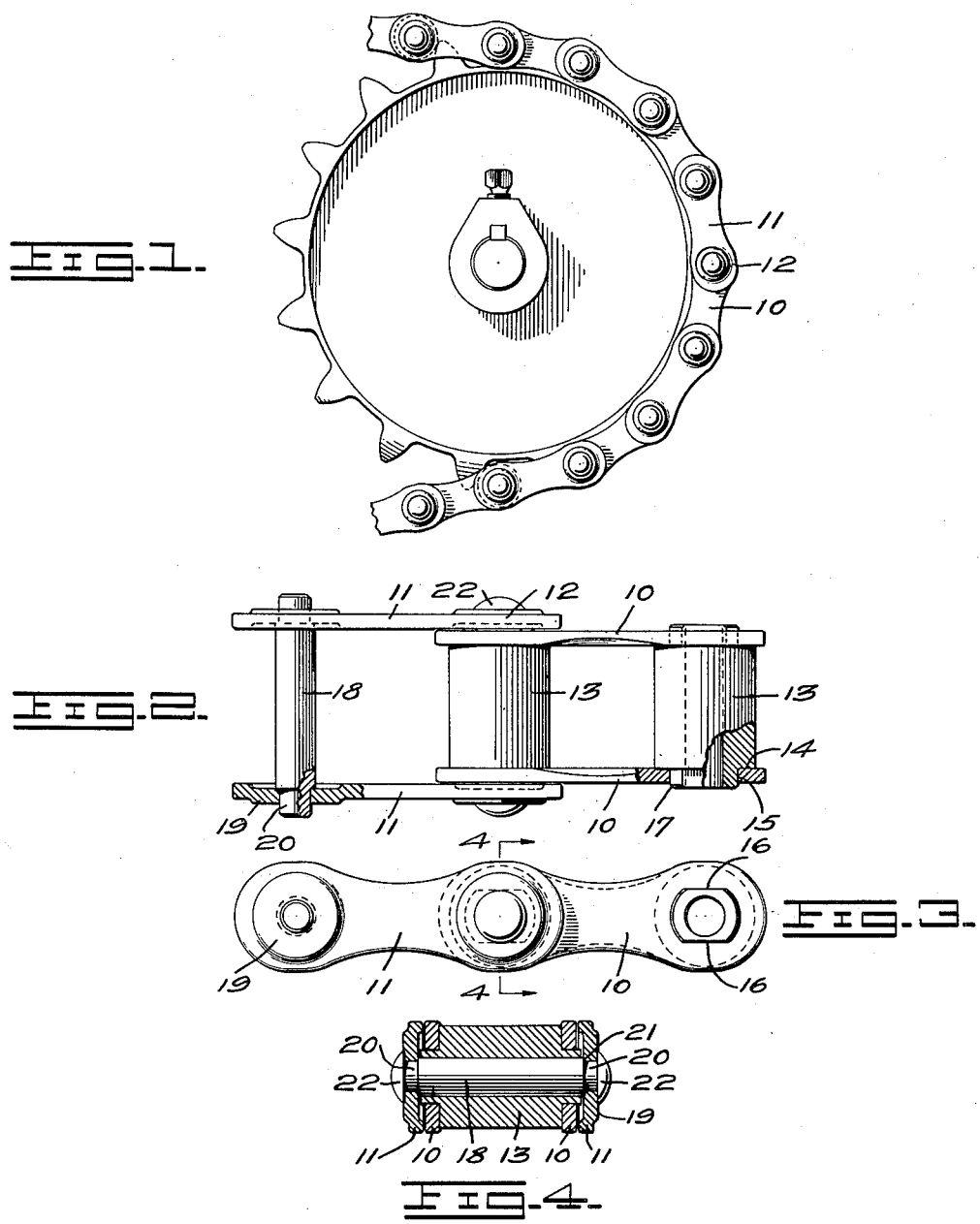
INVENTOR.
Lowell H. Thoen
BY
ATTORNEY.

Patented Mar. 19, 1935

1,994,840

UNITED STATES PATENT OFFICE 1,994,840

CHAIN

Lowell H. Thoen, Stockton, Calif., assignor to Caterpillar Tractor Co., San Leandro, Calif., a corporation of California Application May 27, 1930, Serial No. 456,221

7 Claims. (Cl. 74—251)

My invention relates to improvements in chain; and the objects of my improvement are, first, to provide a light, durable chain which can be easily manufactured; and second, to improve the means for joining together the links of the chain.

I attain these objects by the mechanism illustrated in the accompanying drawing, in which, Fig. 1 is a side elevation of a chain embodying my invention as it appears when in cooperation with a sprocket wheel.

Fig. 2 is a plan view of a portion of my chain with certain parts sectionalized.

Fig. 3 is a side elevation of the parts shown in Fig. 2.

Fig. 4 is a section taken on the line 4—4 in Fig. 3.

Similar numerals refer to similar parts throughout the several views.

The chain is composed of inside links 10 and outside links 11 which are pivoted together at 12. The inside links 10 are maintained in spaced parallel relation by means of spacers or what may be called bushings 13. The ends of the bushings are reduced where they are received in the links 10, thus forming a shoulder 14 and a bearing portion 15 to support the link 10. The reduced end portion of the bushing is flattened as shown at 16 in Fig. 3 to prevent turning of the bushing in the link so that in operation there is no relative rotation between inner link 10 and bushing 13. A pin 18 is journaled for rotation in bushing 13 and has reduced ends 20 which carry links 11 between the shoulders 21 and the riveted heads 22. The end portion 20 of pin 18 prior to being riveted appears as shown in Fig. 2 and is chamfered to facilitate pressing it into the aperture in the link 11. The pin is then riveted, as shown in Fig. 4, to secure the links 11 thereto. In the operation of the chain the pin 18 does not rotate relatively to the links 11. Bushing 13 and inner links 10 move as one unit; pin 18 and outer links 11 move as another unit. Relative rotation takes place between pin 18 and bushing 13. These parts have ample surfaces in contact to take the wear.

Attention is particularly directed to the fact that link 10 has full bearing on portion 15 of bushing 13 and that this portion of bushing 13 extends beyond the outer face of link 10 sufficiently to keep chamfer 17 free of link 10. If the chamfer 17 were inside the outer face of link 10, the bearing portion 15 would be reduced and link 10 would not have full bearing upon it. This would result in decreased area of contact between link 10 and bushing 13 and correspondingly increased unit pressures on the contacting surfaces, which would lead to deformation of the aperture and more rapid wear. It is necessary to chamfer bushing 13 in order to press it into links 10 to insure link 10 operating with bushing 13 as a rigid unit. Allowing the bushing to project beyond the inner link, however, immediately raises another difficulty. The outer link overlaps the inner link and it is desirable that the overlapping portions be kept practically in contact to exclude dirt from the joint. Obviously the protruding bushing prevents this arrangement. A solution is offered in the patent to Witt, No. 1,345,818, issued July 6, 1920, wherein the outer link has been counterbored at the aperture to accommodate the bushing. This construction leads to a further difficulty in that, when the bushing projects from the inner link and the outer link is machined to receive it, the outer link becomes weakened at the bearing point, both by loss of bearing surface on the pin causing more rapid wear, and by loss of cross-sectional area causing increase of unit pressure which results in greater tendency to deform the aperture, thereby allowing the link to work loose on the pin.

Applicant permits the chamfer to extend outside the inner link thereby obtaining the best possible connection between the inner link and the bushing and to avoid weakening the outer link in any respect forms a cup or offset portion 19 in its end where it is pierced for the pin 18. Link 11 has full bearing surface on end portion 20 of pin 18 and without loss of cross-sectional area, as shown in Fig. 2. This is obtained by maintaining the thickness of the link uniform in forming the cup 19; the thickness of the end portion of the link which is connected to the pin is the same thickness as the body portion of the link. Referring to Fig. 2, it will be seen that the inner surface of link 11 and the outer surface of link 10 are substantially in the same plane and that the chamfered end of the bushing (Fig. 4) which extends through the inner link is received in the recess resulting from forming the offset portion 19. Thus three advantageous results are obtained: (1) The inner link has full bearing on the bushing; (2) the outer link has full bearing on the pin without reducing the thickness of the link around the aperture; (3) the outer link overlaps the inner link and has a continuous surface in contact therewith around the joint to exclude dirt.

There results an economical construction. The links can be stamped to finished form without machining. There is no loss in bearing surface as described above.

I claim:

1. In a chain, a pair of substantially parallel links, each link having substantially uniform thickness throughout, having openings in their adjacent ends, a spacer, having shoulders contacting said links, and having bearing portions pressed into said openings and end portions smaller than said openings to facilitate pressing said bearing portions into said openings, the area of contact between each link and the bearing portion of the spacer being substantially equal to the circumference of the opening times the thickness of the link, said end portions lying entirely outside said links when assembled, a pin rotatably mounted in said spacer, having at each end outside said spacer a shoulder, a bearing portion, and a head, a second pair of substantially parallel links, each of said second pair of links having substantially uniform thickness throughout, the ends of said second links having openings into which said pin bearing portions are fitted, the area of contact between each of said second links and said pin being substantially equal to the circumference of the opening in the links times the thickness of the link, each of said second links being held in position on said pin between the head and shoulder on said pin, the ends of said second links being struck out around the openings to prevent alteration of the thickness of the links, to accommodate the projecting end portions of said spacer, and to bring the inner faces of said second links substantially into contact with the outer faces of said first links to prevent the entry of foreign matter to the surfaces of contact of the spacer and pin.

2. In a chain, a pair of parallel links, each link having an aperture adjacent an end thereof to thus provide a pair of alined apertures, the thickness of said links about the apertures being substantially the same as the thickness of the bodies of said links, a bushing having end portions press fitted in said apertures to fix the bushing for movement with said links, the ends of said bushing extending beyond the outer faces of said links to provide for full bearing surface between said links and said bushing, a pin journaled in said bushing and having reduced end portions projecting beyond said ends of said bushing, said reduced end portions of said pin forming shoulders adjacent said ends of said bushing, a second pair of parallel links on said reduced end portions of said pin, and heads on the outer ends of said pin between which and said pin shoulders said second pair of links is held, said second pair of links having struck-out portions adjacent said pins which are of substantially the same thickness as the bodies of said second pair of links, whereby the inner faces of said second pair of links are closely adjacent the outer faces of said first pair of links.

3. In a chain, a pair of parallel links, each link having an aperture adjacent an end thereof to thus provide a pair of alined apertures, the thickness of said links about the apertures being substantially the same as the thickness of the bodies of said links, a bushing having reduced end portions press fitted in said apertures to fix the bushing for movement with said links, said reduced end portions providing shoulders abutting the inner faces of said links, the ends of said reduced end portions extending beyond the outer faces of said links to provide for full bearing surface between said links and said bushing, a pin journaled in said bushing and having reduced end portions projecting beyond said ends of said bushing, said reduced end portions of said pin forming shoulders adjacent said ends of said bushing, a second pair of parallel links on said reduced end portions of said pin, and heads on the outer ends of said pin between which and said pin shoulders said second pair of links is held, said second pair of links having struck-out portions adjacent said pins which are of substantially the same thickness as the bodies of said second pair of links, whereby the inner faces of said second pair of links are closely adjacent the outer faces of said first pair of links.

4. In a chain, a pair of parallel links, each link having a non-circular aperture adjacent an end thereof to thus provide a pair of alined non-circular apertures, the thickness of said links about the apertures being substantially the same as the thickness of the bodies of said links, a bushing having reduced non-circular end portions press fitted in said apertures to fix the bushing for movement with said links, said reduced end portions providing shoulders abutting the inner faces of said links, the ends of said reduced end portions being chamfered to facilitate said press fitting, and extending beyond the outer faces of said links to provide for full bearing surface between said links and said bushing, a pin journaled in said bushing and having reduced end portions projecting beyond said ends of said bushing, said reduced end portions of said pin forming shoulders adjacent said ends of said bushing, a second pair of parallel links on said reduced end portions of said pin, and heads on the outer ends of said pin between which and said pin shoulders said second pair of links is held, said second pair of links having struck-out portions adjacent said pins which are of substantially the same thickness as the bodies of said second pair of links, whereby the inner faces of said second pair of links are closely adjacent the outer faces of said first pair of links.

5. In a chain, a pair of parallel links, each link having a non-circular aperture adjacent an end thereof to thus provide a pair of alined non-circular apertures, the thickness of said links about the apertures being substantially the same as the thickness of the bodies of said links, said links being stamped into completely finished form, a bushing having reduced non-circular end portions press fitted in said apertures to fix the bushing for movement with said links, said reduced end portions providing shoulders abutting the inner faces of said links, the ends of said reduced end portions being chamfered to facilitate said press fitting, and extending beyond the outer faces of said links to provide for full bearing surface between said links and said bushing, a pin journalled in said bushing and having reduced end portions projecting beyond said ends of said bushing, said reduced end portions of said pin forming shoulders adjacent said ends of said bushing, a second pair of parallel links on said reduced end portions of said pin, and heads on the outer ends of said pin between which and said pin shoulders said second pair of links is held, said second pair of links having struck-out portions adjacent said pins which are of substantially the same thickness as the bodies of said second pair of links, whereby the inner faces of said second pair of links are closely adjacent the outer faces of said first pair of links, said second pair of links being stamped into completely finished form.

6. In a chain, a pair of parallel links, each link having an aperture adjacent an end thereof to thus provide a pair of alined apertures, the thickness of said links about the apertures being substantially the same as the thickness of the bodies of said links, said links being stamped into completely finished form, a bushing having reduced end portions press fitted in said apertures to fix the bushing for movement with said links, said reduced end portions providing shoulders abutting the inner faces of said links, the ends of said reduced end portions extending beyond the outer faces of said links to provide for full bearing surface between said links and said bushing, a pin journaled in said bushing and having reduced end portions projecting beyond said ends of said bushing, said reduced end portions of said pin forming shoulders adjacent said ends of said bushing, a second pair of parallel links on said reduced end portions of said pin, and heads on the outer ends of said pin between which and said pin shoulders said second pair of links is held, said second pair of links having struck-out portions adjacent said pins which are of substantially the same thickness as the bodies of said second pair of links, whereby the inner faces of said second pair of links are closely adjacent the outer faces of said first pair of links, said second pair of links being stamped into completely finished form.

7. In a chain, a pair of parallel links, each link having an aperture adjacent an end thereof to thus provide a pair of alined apertures, the thickness of said links about the apertures being substantially the same as the thickness of the bodies of said links, a bushing having end portions press fitted in said apertures to fix the bushing for movement with said links, the ends of said bushing extending beyond the outer faces of said links to provide for full bearing surface between said links and said bushing, a pin journaled in said bushing and having reduced end portions projecting beyond said ends of said bushing, said reduced end portions of said pin forming shoulders adjacent said ends of said bushing, a second pair of parallel links on said reduced end portions of said pin, and retaining means for said second pair of links on the outer end portions of said pin between which and said pin shoulders said second pair of links is held, said second pair of links having end portions formed to accommodate the projecting ends of the bushing and which are of substantially the same thickness as the bodies of said second pair of links.

LOWELL H. THOEN.